(12) United States Patent
McCallion et al.

(10) Patent No.: US 6,511,571 B2
(45) Date of Patent: *Jan. 28, 2003

(54) METHOD FOR FABRICATING AN OPTICAL WAVEGUIDE

(75) Inventors: Kevin J. McCallion, Boston, MA (US); Brian L. Lawrence, Watervliet, NY (US); Gregory A. Wagoner, Sunnyvale, CA (US); Paul R. Quantock, Stillwater, NY (US); John L. Schulze, Fort Edward, NY (US)

(73) Assignee: Molecular OptoElectronics Corporation, Watervliet, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/852,334

(22) Filed: May 9, 2001

(65) Prior Publication Data

US 2001/0041040 A1 Nov. 15, 2001

Related U.S. Application Data

(63) Continuation of application No. 09/121,455, filed on Jul. 23, 1998, now Pat. No. 6,270,604.

(51) Int. Cl.$^7$ .............................................. B32B 31/18
(52) U.S. Cl. ..................... 156/250; 156/99; 156/153; 156/267; 156/281; 264/1.24; 501/86; 359/885
(58) Field of Search ....................... 156/99, 153, 281, 156/250, 267; 264/1.24; 501/86; 359/885

(56) References Cited

U.S. PATENT DOCUMENTS

| | | | |
|---|---|---|---|
| 3,590,004 A | 6/1971 | Woodcock | 252/301.4 |
| 3,826,992 A | 7/1974 | Feiedl | 330/4.3 |
| 4,428,646 A | 1/1984 | Lighty | 350/96.31 |
| 4,515,431 A | 5/1985 | Shaw et al. | 350/96.15 |

(List continued on next page.)

FOREIGN PATENT DOCUMENTS

| | | | |
|---|---|---|---|
| EP | 0136047 A2 | 4/1985 | H01S/3/06 |
| EP | 0224070 A2 | 6/1987 | H01S/3/06 |

(List continued on next page.)

OTHER PUBLICATIONS

Olsson, N.A., "400 Mbit/s, 372 km Coherent Transmission Experiment Using In–line Optical Amplifiers," Electronic Letters, vol. 24, No. 1, pp. 36–38 (Jan. 7, 1988).

Lawrence et al., pending U.S. patent application Serial No. 09/849,074, filed May 4, 2001, entitled "Optical Channel Waveguide Amplifier" (Attorney Docket No. 0953.060A).

(List continued on next page.)

Primary Examiner—Curtis Mayes
(74) Attorney, Agent, or Firm—Kevin P. Radigan, Esq.; Heslin Rothenberg Farley & Mesiti P.C.

(57) ABSTRACT

A method in which a separate preformed optical material is suitably sized for easy handling, manipulation, and fabrication into a waveguide having a core (formed from the optical material) having transverse cross-sectional dimensions on the order of only tens of microns. The method may include a plurality of mechanical steps, e.g., lapping, polishing, and/or dicing, and bonding steps, e.g., attaching with adhesives. In one embodiment, the method includes the steps of providing an optical material, thinning and polishing the optical material to form a core comprising a plurality of longitudinally extending surfaces, providing a plurality of support substrates, and attaching the plurality of support substrates to the longitudinally extending surfaces of the core. The plurality of support substrates may be attached to the plurality of longitudinally extending surfaces of the optical material with an adhesive. The optical material may include a high refractive index, and the plurality of support substrates and/or the adhesive may include a low refractive index.

76 Claims, 5 Drawing Sheets

U.S. PATENT DOCUMENTS

| | | | |
|---|---|---|---|
| 4,603,940 A | 8/1986 | Shaw et al. | 350/96.15 |
| 4,712,075 A | 12/1987 | Snitzer | 330/4.3 |
| 4,742,307 A | 5/1988 | Thylén | 330/4.3 |
| 4,867,518 A | 9/1989 | Stamnitz et al. | 350/96.15 |
| 4,895,422 A | 1/1990 | Rand et al. | 350/96.15 |
| 4,964,134 A | 10/1990 | Westbrook et al. | 372/45 |
| 4,995,696 A | 2/1991 | Nishimura et al. | 350/96.2 |
| 5,005,175 A | 4/1991 | Desurvire et al. | 372/6 |
| 5,037,181 A | 8/1991 | Byer et al. | 385/144 |
| 5,045,397 A | 9/1991 | Jensen | 428/429 |
| 5,064,265 A | 11/1991 | Khanarian et al. | 385/130 |
| 5,201,977 A | 4/1993 | Aoshima | 156/153 |
| 5,274,495 A | 12/1993 | Shirasaki | 359/330 |
| 5,349,600 A | 9/1994 | Shinbori et al. | 372/92 |
| 5,396,362 A | 3/1995 | Yakymyshyn et al. | 359/245 |
| 5,441,803 A | 8/1995 | Meissner | 428/220 |
| 5,479,542 A | 12/1995 | Krivoshlykov | 385/30 |
| 5,540,799 A * | 7/1996 | Lebby et al. | |
| 5,543,960 A | 8/1996 | Carrig et al. | 359/326 |
| 5,563,899 A | 10/1996 | Meissner et al. | 372/39 |
| 5,563,979 A | 10/1996 | Bruce et al. | 385/142 |
| 5,717,517 A | 2/1998 | Alfano et al. | 359/342 |
| 5,815,309 A | 9/1998 | Lawrence et al. | 359/333 |
| 5,846,638 A | 12/1998 | Meissner | 428/220 |
| 5,892,857 A | 4/1999 | McCallion | 385/1 |
| 6,052,220 A | 4/2000 | Lawrence et al. | 359/341 |
| 6,141,475 A | 10/2000 | Lawrence et al. | 385/123 |
| 6,198,569 B1 | 3/2001 | Lawrence et al. | 359/333 |
| 6,208,456 B1 | 3/2001 | Lawrence | 359/333 |
| 6,270,604 B1 * | 8/2001 | McCallion et al. | |

FOREIGN PATENT DOCUMENTS

| | | | |
|---|---|---|---|
| EP | 0343489 A2 | 5/1989 | H01S/3/00 |
| EP | 0324541 A2 | 7/1989 | H01S/3/06 |
| EP | 0409258 A2 | 7/1990 | H01S/3/06 |
| EP | 0409258 A2 | 1/1991 | |
| EP | 0415167 A1 | 3/1991 | H01S/3/06 |
| EP | 0416301 A2 | 3/1991 | C30B/33/06 |
| EP | 0450603 A2 | 10/1991 | H01S/3/25 |
| EP | 0477898 A2 | 4/1992 | H01S/3/06 |
| EP | 0 510 883 A2 | 10/1992 | |
| EP | 0 511 069 A1 | 10/1992 | |
| JP | 61-228403 | 10/1986 | G02B/6/12 |
| JP | 62-069207 | 3/1987 | G02B/6/12 |
| JP | 02 001831 A | 1/1990 | |
| JP | 03-003282 | 1/1991 | |
| JP | 03-003283 | 1/1991 | H01S/3/06 |
| JP | 03-071115 | 3/1991 | G02F/1/35 |
| JP | 6-34829 | 2/1994 | |
| JP | 06-174955 | 6/1994 | G02B/6/12 |
| JP | 06-196788 | 7/1994 | H01S/3/10 |
| JP | 08 295524 A | 11/1996 | |
| JP | 8-316562 | 11/1996 | |
| WO | 00/20904 | 4/2000 | G02B/6/00 |
| WO | WO 80/20904 | 4/2000 | |
| WO | 00/72478 | 11/2000 | H04B/10/00 |

OTHER PUBLICATIONS

Rogin, P. and Hulliger, J., "Epitaxial Nd:YLF linear waveguide laser," Optics Letters, vol. 22, No. 22, pp. 1701–1703 (Nov. 15, 1997).

Izatt, Joseph A., Kulkami, Manish D., Kobayashi, Kenji, Sivak, Michael V., Barton, Jennifer, K., Welch, and Ashley J., "Optical Coherence Tomography For Biodiagnostics." Optics & Photonics News, pp. 41–47 and 65 (May 1997).

Li, Cheng Chung, Kim, Hong Koo, and Migliuolo, Michele, "Er–Doped Glass Ridge–Waveguide Amplifiers Fabricated with a Collimated Sputter Deposition Technique," IEEE Photonics Technology Letters, vol. 9, No. 9, pp. 1223–1225 (Sep. 1997).

Field, S.J., Hanna, D.C., Large, A.C., Shepherd, D.P., and Tropper, A.C., "Ion–implanted Nd:GGG channel waveguide laser," Optics Letters, vol. 17, No. 1, pp. 52–54 (Jan. 1, 1992).

Sanford, N.A., Aust, J.A,. Malone, K.J., and Larson, D.R., "Nd:LiTaQ$_3$waveguide laser," Optics Letters, vol. 17, No. 22, pp. 1578–1580, (Nov. 15, 1992).

K. Suto et al., "Semiconductor Raman Laser with Pump Light Wavelength in the 800 nm Region," 1046 Journal of the Electrochemical Society 140(Jun., 1993) No. 6, Manchester, NH, US, 8 pp.

Baumgartner, Richard A. et al., "Optical Parametric Amplification," IEEE Journal of Quantum Electronics, vol. QE–15, No. 6, pp. 432–444 (Jun. 1979).

Bortz, M. L. et al., "Increased Acceptance Bandwidth for Quasi–Phasematched Second Harmonic Generation in LiNbO$_3$ Waveguides, " IEEE, 2 pages (Oct. 28, 1993).

Bradley, David, "Plastics That Play on Lights," Science, vol. 261, pp. 1272–1273, (Sep. 1993).

Chartier, I. et al., "Growth and Low–Threshold Laser Oscillation of an Expitaxially Grown Nd:YAG Waveguide," Optic Letters, vol. 17, p. 810 (1992).

Creaney, S. et al. "Continuous–Fiber Modulator with High–Bandwidth Coplanar Strip Electrodes," IEEE Photonics Technology Letters, vol. 8, No. 3, pp. 355–357 (Mar. 1996).

Fawcett, G. et al., "In–Line Fribre–Optic Intesity Modulator Using Electro–Optic Polymer," Electronic Letters, vol. 28, No. 11, pp. 985–986 (May 1992).

Helmfrid, S. et al., "Optical Parametric Amplification of a 1.54 $\mu$m Single–Mode DFB Laser in a Ti:LiNbO$_3$ Waveguide," Journal of Lightwave Technology, vol. 11, No. 9, pp. 1459–1469 (Sep. 1993).

Kozlov, V.A. et al. "In–Line Singlemode Fibre Based on LiF:F$_2$–crystals," Electronic Letters, vol. 31, No. 24, p. 2104 (Nov. 23, 1995).

Marder, Seth R. and Perry, Joseph W., "Nonlinear Optical Polymers: Discovery to Market in 10 Years?" Science, vol. 263, pp. 1706–1707 (Mar. 1994).

McCallion, K. et al., "Investigation of Optical Fibre Switch Using Electro–Optic Interlays" (Dec. 1991).

Millar, C.A. et al., "Exposed–Core Single–Mode Fiber Channel–Dropping Filter Using a High–Index Overlay Waveguide," Optical Society of America, vol. 12, No. 4, pp. 284–286 (Apr. 1987).

Panajotov, Krassimir P., "Evanescent Field Coupling Between a Single–Mode Fiber and a Planar Waveguide with Absorption or Gain", Optical Society of America, vol. 13, No. 11, pp. 2468–2476 (Nov. 1996).

Stewart, Kevin R., "Organic Crystals Give Optoelectronics a Boost," Photonics Sprectra, pp. 104–108 (Jul. 1994).

Thyagarajan, K. et al., "Proton–exchanged Periodically Segmented Waveguides in LiNbO$_3$," Optics Letters, vol. 19, No. 12, pp. 880–882 (Jun. 15, 1994).

Lawrence et al., pending U.S. patent application Serial No. 09/252,731, filed Feb. 19, 1999, entitled "Fiber Optic Lasers Employing Fiber Optic Amplifiers".

Lawrence et al., pending U.S. patent application Serial No. 09/159,012, filed Sep. 23, 1998, entitled "Optical Channel Waveguide Amplifier".

Lawrence et al., pending U.S. patent application Serial No. 09/702,077, filed Oct. 30, 2000 entitled "Optical Waveguide With Dissimilar Core And Cladding Materials, And Light Emitting Device Employing The Same".

Lawrence, pending U.S. patent appication Serial No. 09/768,828, filed Jan. 23, 2001, entitled "Compact Optical Amplifier With Integrated Optical Waveguide and Pump Source".

Lawrence, pending U.S. patent application Serial No. 09/518,390, filed Mar. 3, 2000, entitled "Compact Optical Amplifier With Integrated Optical Waveguide and Pump Source".

Becker, P.C., "Erbium–Doped Fiber Amplifiers—Fundamentals and Technology," Academic Press, Chapter 7. Fiber Amplifiers and Systems—Noise Theory, pp. 210–212 (1999).

Marshall, I.W., "Low Loss Coupling Between Semiconductor Lasers and Single–mode Fibre Using Tapered Lensed Fibres," Br Telecom Technol J, vol. 4, No. 2, pp. 114–121 (Apr. 2, 1986).

U. Griebner et al., "Efficient laser operation with nearly diffraction–limited output from a diode–pumped heavily Nd–doped multimode fiber," Opt. Lett., 21, 266 (1996).

* cited by examiner

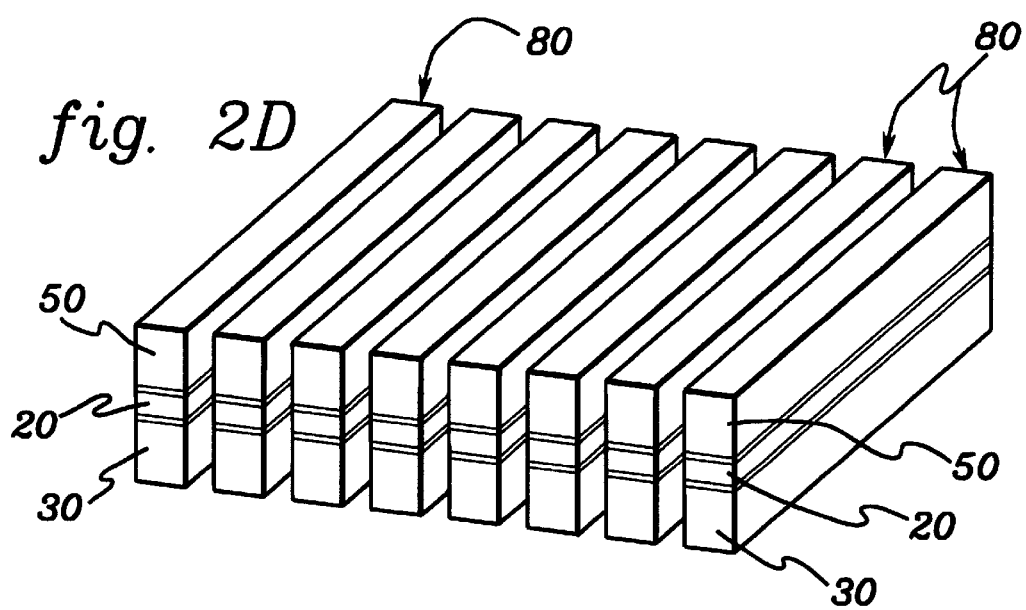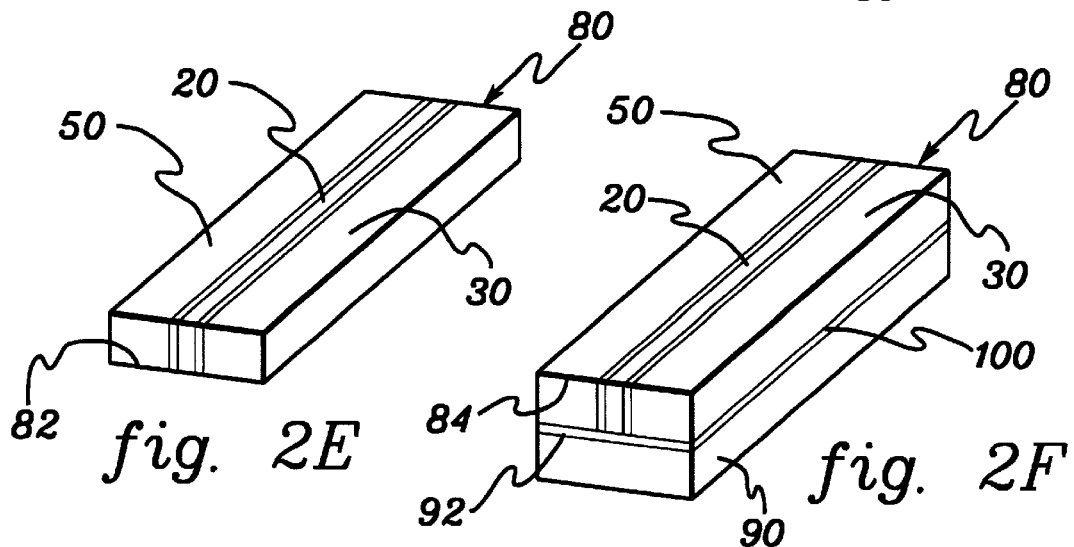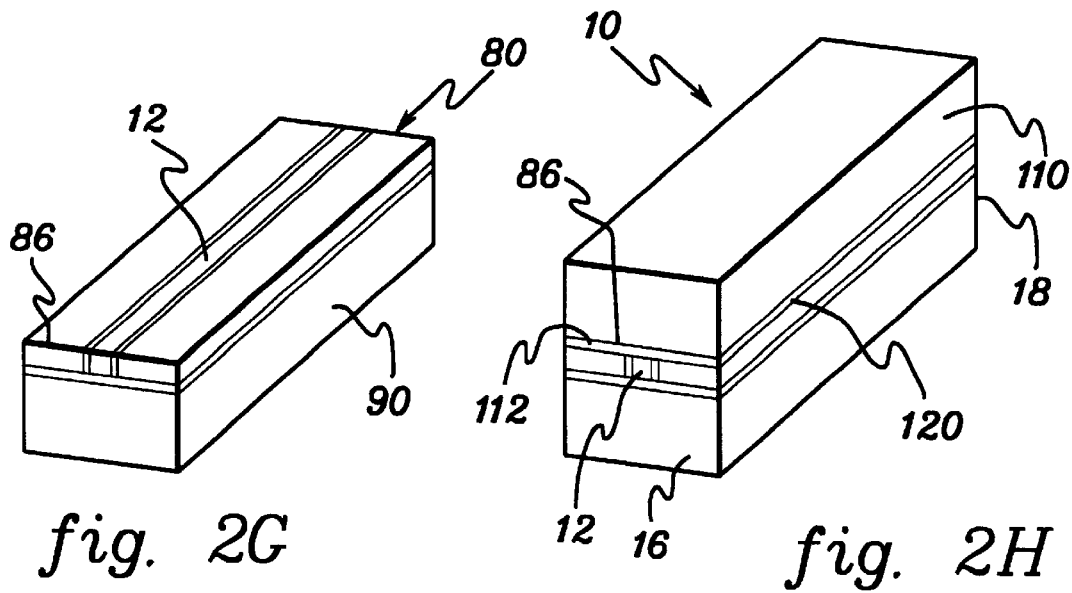

FROM FIG. 3A

```
POLISHING A SURFACE OF EACH SLICE IN
WHICH THE SURFACE COMPRISES THE
FIRST SUBSTRATE, THE OPTICAL
MATERIAL, AND THE SECOND SUBSTRATE
```

```
PROVIDING A PLURALITY OF THIRD
SUPPORT SUBSTRATES

POLISHING A SURFACE OF EACH THIRD
SUPPORT SUBRTATE

ATTACHING THE POLISHED SURFACE OF
THE SLICES TO THE POLISHED SURFACE
OF THE THIRD SUPPORT SUBSTRATES
```

```
THINNING AND POLISHING A SECOND
SURFACE OF THE SLICES
```

```
PROVIDING A PLURALITY OF FOURTH
SUBSTRATES

POLISHING A SURFACE OF EACH FOURTH
SUPPORT SUBRTATE

ATTACHING THE POLISHED SURFACE OF
THE SLICES TO THE POLISHED SURFACE
OF THE FOURTH SUPPORT SUBSTRATES

POLISHING OPPOSITE ENDS TO FORM A
PLURALITY OF
OPRICAL WAVEGUIDES
```

*fig. 3B*

METHOD FOR FABRICATING AN OPTICAL WAVEGUIDE

CROSS-REFERENCE TO RELATED APPLICATIONS

This application is a continuation of U.S. patent application Ser. No. 09/121,455 filed Jul. 23, 1998 and entitled "METHOD FOR FABRICATING OPTICAL WAVEGUIDE", now U.S. Pat. No. 6,270,604, and also relates to the following commonly assigned patent application.

U.S. patent application Ser. No. 09/121,454, and entitled "Optical Waveguide with Dissimilar Core and Cladding Materials, and Light Emitting Device Employing Same."

This application is hereby incorporated by reference herein in its entirety.

TECHNICAL FIELD

This invention relates in general to waveguides, and in particular to novel methods for fabricating optical waveguides.

BACKGROUND INFORMATION

Waveguides constrain or guide the propagation of electromagnetic waves along a path defined by the physical construction of the waveguide. The use of optical channel waveguides is widespread in integrated optical circuits. In particular, an optical channel waveguide provides both vertical and lateral confinement of an optical wave while allowing low-loss signal propagation.

An optical channel waveguide having small cross-sectional dimensions allows high optical power densities to be established for moderate optical input powers while the waveguiding nature provides potentially long interaction lengths. This combination of effects is extremely attractive for a variety of optical functions such as second harmonic generation, optical amplification, wavelength conversion, and phase modulation (when an appropriate electrode geometry is incorporated).

In general, a goal of waveguide fabrication is to produce waveguides which support a single guided mode of propagation of the electromagnetic waves. A number of techniques have been used with considerable success to fabricate optical channel waveguides. These include ion-exchange in glass substrates, ion indiffusion or proton exchange in $LiNbO_3$ substrates, pattern definition by laser ablation, photolithography of spun polymer films, and epitaxial growth and selective etching of compound semiconductor films.

A drawback of these techniques is that they cannot be used with a significant number of useful optical materials, e.g., many laser crystals. Another drawback of these prior art techniques is that the equipment required to fabricate the optical waveguide is expensive.

Therefore, there is a need for methods for forming optical waveguides from separate preformed optical materials in which the methods comprise a plurality of mechanical processing steps, e.g., lapping, polishing, and/or dicing, and bonding steps, e.g., attaching with adhesives. Such methods are adaptable to fabrication of optical waveguides from any, if not all, optical materials. Furthermore, such methods are suitably performed using readily available and inexpensive equipment.

SUMMARY OF THE INVENTION

Pursuant to the present invention, the shortcomings of the prior art are overcome and additional advantages provided through the provision of a method for forming an optical waveguide from separate preformed materials. For example, one embodiment of the method for forming an optical waveguide comprises the steps of providing an assembly comprising an optical material between a first support substrate and a second support substrate, providing a third support substrate and a fourth support substrate, and attaching to opposite surfaces of the assembly, a third support substrate and a fourth support substrate, wherein the opposite surfaces each comprise the first support substrate, the optical material, and the second support substrate.

In one expect of the invention, the step of providing the assembly comprises providing the optical material comprising a polished surface, attaching the polished surface to the first substrate, thinning and polishing a second surface of the optical material, and attaching a second support substrate to the second polished surface.

In another aspect of the invention, the step of attaching opposite surfaces of the assembly between a third support substrate and a fourth support substrate comprises the steps of polishing a surface of the assembly, wherein the surface comprises the first support substrate, the optical material, and the second support substrate, attaching the polished surface of the assembly to the third support substrate, thinning and polishing an opposite surface of the assembly, wherein the opposite surface comprises the first support substrate, the optical material, and the second support substrate, and attaching the opposite polished surface to the fourth support substrate.

In another aspect of the present invention, the method further comprising the step of dicing the first assembly to form a plurality of assemblies, wherein each of the plurality of assemblies is attachable to separate support structures for forming separate optical waveguides.

In another embodiment of the present invention for forming a waveguide, the method comprising the steps of providing an optical material, thinning and polishing the optical material to form a core comprising a plurality of longitudinally extending surfaces, providing a plurality of support substrates, and adhesively attaching the plurality of support substrates to the longitudinally extending surfaces of the core. Desirably, the plurality of support substrates are attached to the plurality of longitudinally extending surfaces of the optical material with an adhesive. The optical material may comprise a high refractive index, and the plurality of support substrates and/or the adhesive may comprise a low refractive index.

The optical waveguides fabricated according to the present invention, when the core comprises an optical gain material, are particularly suitable for lasers and amplified spontaneous emission (ASE) sources for imaging and spectroscopy applications where multi-mode fibers are used to handle high power, as well as test instrumentation for the telecommunications and cable television industries where single mode delivery is required. Additional and detailed uses of the optical waveguides of the present invention are described in the above-incorporated application.

BRIEF DESCRIPTION OF THE DRAWINGS

The above-described objects, advantages and features of the present invention, as well as others, will be more readily understood from the following detailed description of certain proffered embodiments of the invention, when considered in connection with the accompanying drawings in which:

FIGS. 2A–2H are diagrammatic illustrations of one embodiment of the fabrication sequence for forming the optical waveguide shown in FIG. 1; and FIGS. 3A and 3B together provide a flowchart of the fabrication sequence of the optical waveguide shown in FIG. 2.

DETAILED DESCRIPTION OF THE PREFERRED EMBODIMENT

Figure 1:
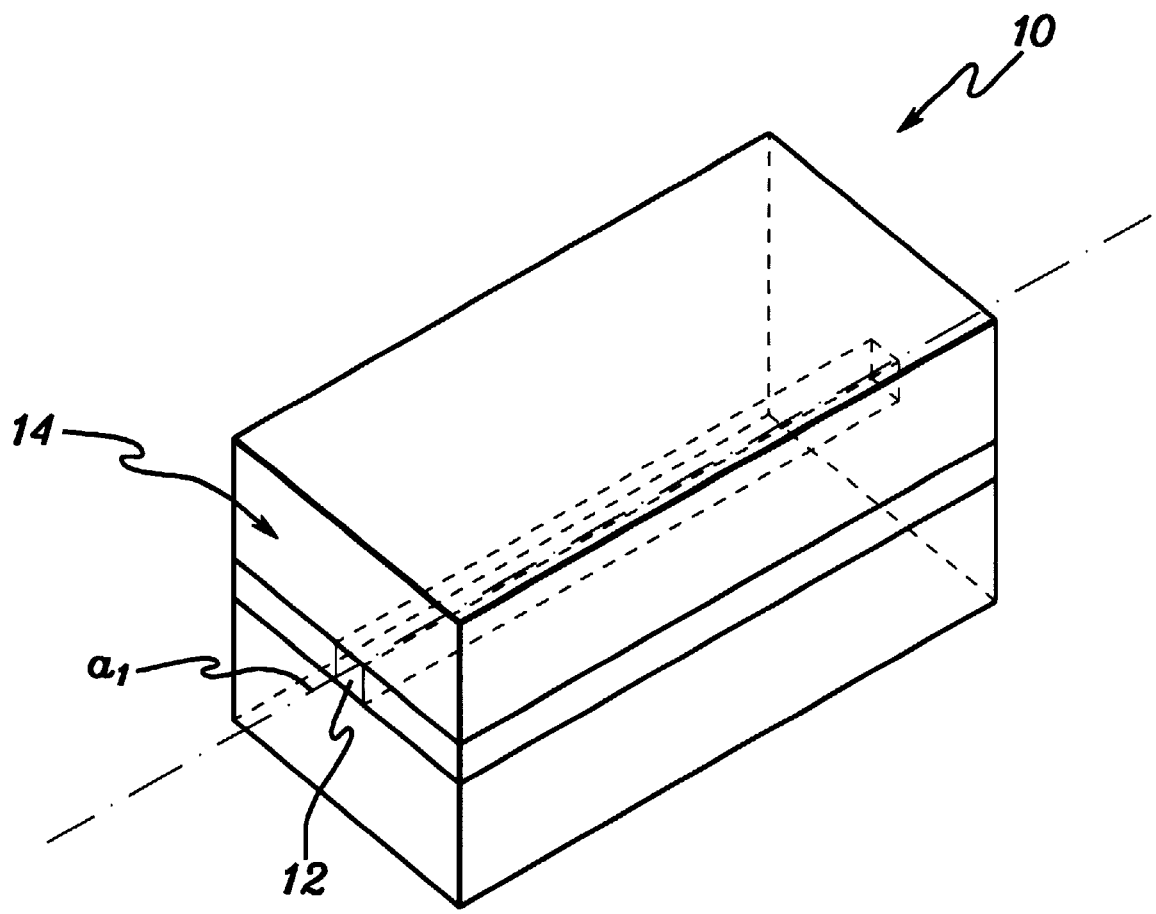
FIG. 1 is a perspective view of an optical waveguide fabricated in accordance with the methods of the present invention.

With reference to FIG. 1, therein illustrated is one embodiment of an optical waveguide 10 constructed in accordance with the principles of the present invention. As explained in greater detail below, a novel series of successive precision polishing and bonding steps allows quick and inexpensive fabrication of waveguide 10 having a core 12 surrounded by suitable cladding or support substrate 14. For use as an optical waveguide, core 12 comprises a high refractive index while cladding or support substrate 14 comprises a low refractive index. For example, optical material 12 may comprise a relatively expensive laser crystal, and cladding or support substrate 14 may comprise a relatively low cost glass material, e.g., fused silica.

In the illustrated embodiment shown in FIG. 1, optical waveguide 10 is in the form of a channel waveguide having a substantially square cross-section. The elongated shape of core 12 provides a propagation axis a, therein which may be longitudinally aligned with the outer surfaces of the support substrate.

The fabrication of optical waveguide 10 comprises a multi-step process of precision polishing and/or lapping techniques to mechanically thin a preformed optical material to form a core of the optical waveguide having a desired thickness in both the lateral and the vertical orientations. Optical adhesives are used to bond the core to preformed surrounding support substrates. The core and the cladding or support substrate may comprise dissimilar materials, e.g., materials which are structurally and/or chemically distinct, and which have been separately fabricated as physically different materials and brought together during the assembly process for the optical waveguide.

Advantageously, the various methods according to the present invention may be performed by a machinist in which separate preformed optical materials are initially suitably sized for easy manipulation and fabrication according to the present invention. For example, an initially sized optical material may have a width of about 20 mm, a length of about 20 mm, and a thickness of about 0.5 mm to about 1 mm for easy manipulation, and which may be fabricated into a core of an optical waveguide in which the core has cross-sectional dimensions on the order of only tens of microns.

FIGS. 2A–2H diagrammatically illustrate a sequence of steps of one embodiment according to the present invention for fabricating optical waveguide 10. FIGS. 3A and 3B together form a flowchart which describes each of the steps illustrated in FIGS. 2A–2H in greater detail.

In this illustrated and described method, core 12 (best illustrated in FIGS. 1 and 2H) of optical waveguide 10 desirably has a square cross-section that measures, e.g., 20 $\mu$m×20 $\mu$m. Thus, the separate preformed materials used in the fabrication of optical waveguide 10 have been shown out of scale in the drawings for purposes of illustration.

In this illustrated method, initially an optical material 20 (from which core 12 will be formed) is attached to a first support substrate 30. For example, optical material 20 may be planar in shape having a width of about 20 mm, a length of about 20 mm, and a thickness of about 0.5 mm to about 1 mm. First support substrate 30 may also be planar in shape having a width of about 20 mm, a length of about 20 mm, and a thickness of about 2 mm.

Optical material 20 comprises a bottom surface 22 and a top surface 24. Prior to attaching optical material 20 to first support substrate 30, bottom surface 22 may be optically polished flat and smooth, e.g., so that the surface becomes transparent. Bottom surface 22 may be optically polished by standard lapping and polishing techniques, e.g., in which the optical material is moved over a flat plate on which a liquid abrasive has been poured. The process of lapping and polishing may use water-based slurries with varying particle sizes (e.g., about 0.5 $\mu$m to about 9 $\mu$m) and types of abrasives (e.g., aluminum oxide and cerium oxide). The dimensions of the optical material can be measured using a micrometer gauge with processing being terminated upon reaching the desired surface quality and/or thickness. Accuracies of about 1 $\mu$m can be achieved. In addition, the use of high precision polishing jigs allows exceptional flatness of surfaces, as well as, surfaces being parallel (and/or perpendicular) to each other.

A value of flatness suitable for surface 22 may be determined based on the wavelength of light for which the optical waveguide will be used. For example, where the optical waveguide will be used with light having a wavelength of 1 $\mu$m, a suitable flatness may be about 0.05 $\mu$m over, e.g., the length or the thickness. In addition, surface 22 desirably has a smooth surface quality, i.e., little, if any scratches, pits or surface damage. For example, surface 22 desirably has a scratch to dig designation of about 5–10 which is typically desired in optical components for use in laser applications.

A top surface 32 of first support substrate 30 may be optically polished, e.g., by lapping and polishing, as described above with reference to surface 22 of optical material 20, so that the surface is flat and smooth. Optically polished surfaces 22 and 32 may then be adhesively attached to each other with a suitable layer of optical adhesive 40. Desirably, layer of optical adhesive 40 is formed with a thickness less than about 2 $\mu$m.

Figure 2A:
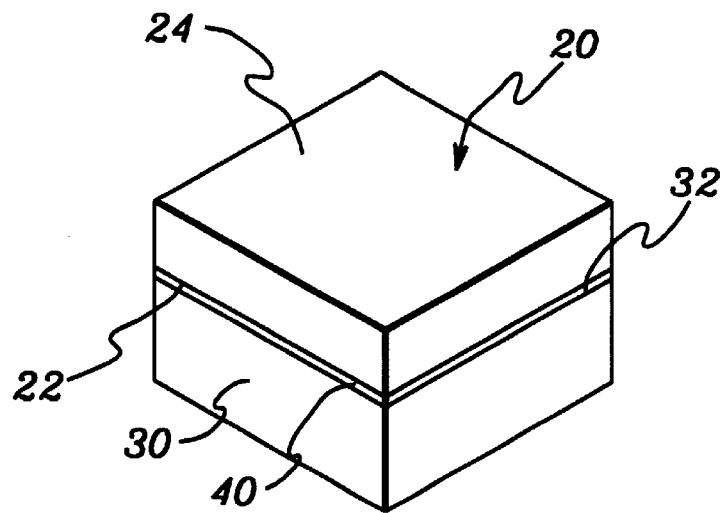
Figure 2B:
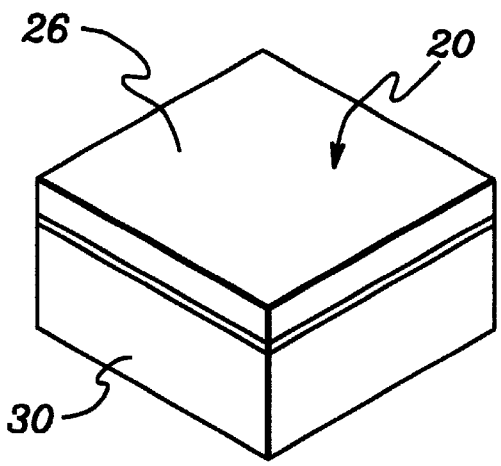
Figure 3A:
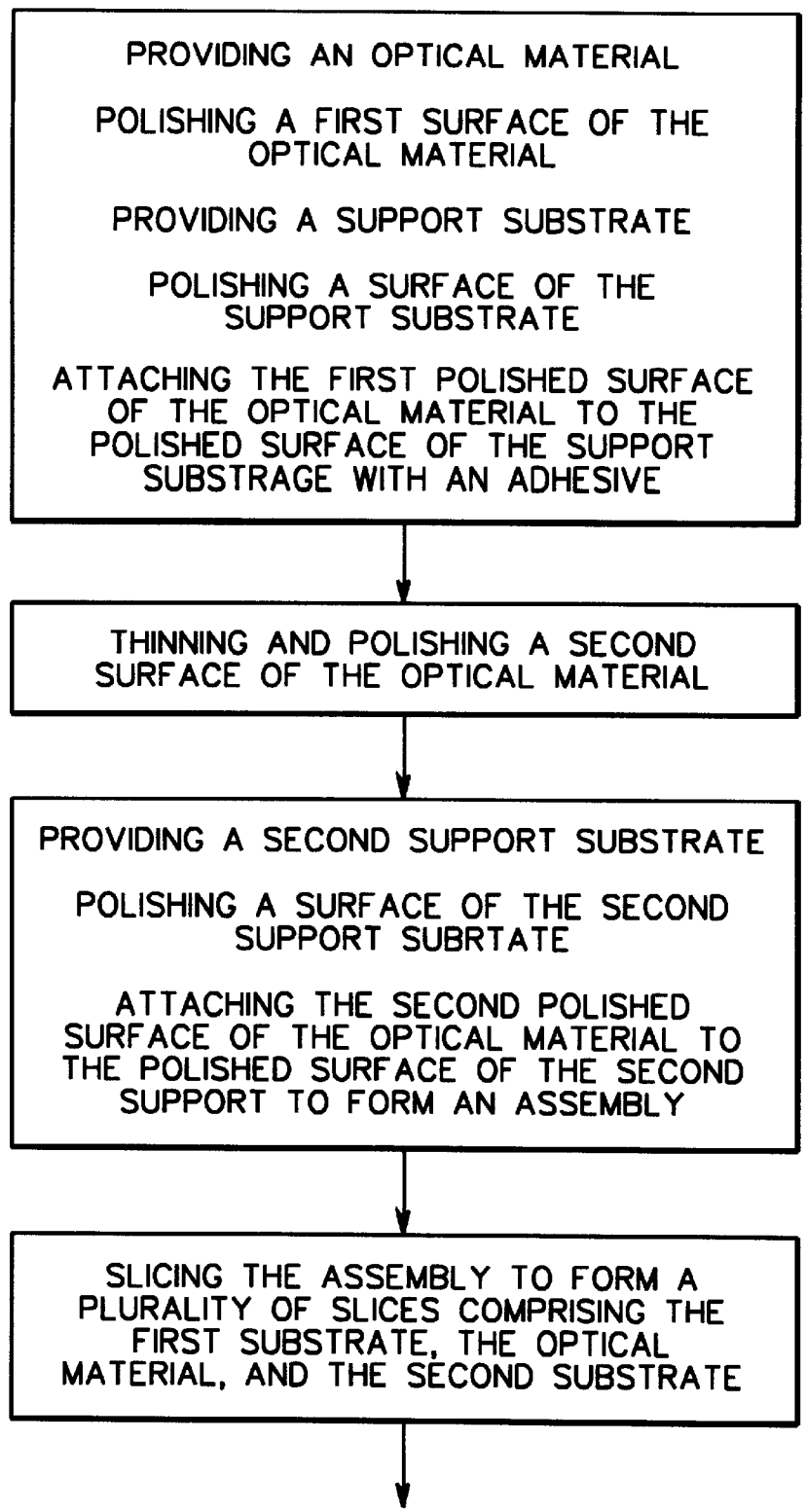

With reference to FIG. 2B, in which optical material 20 is attached to first support substrate 30, top surface 24 (FIG. 2A) is thinned and optically polished, e.g., by lapping to reduce the thickness a carefully controlled amount and polishing to obtain an optically polished surface 26 as described above. In this illustrated method of fabrication, optical material 20 initially comprises a thickness of about 0.5 to about 1 mm, which is reduced in thickness to about 20 $\mu$m.

Figure 2C:
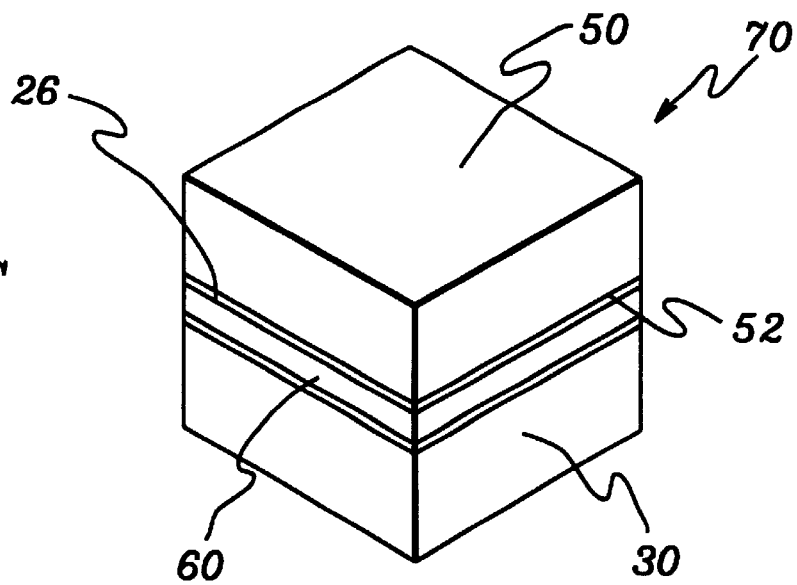

A second support substrate 50 is then attached to optically polished surface 26 of the thinned optical material 20 to form an assembly 70, as shown in FIG. 2C. A bottom surface 52 of second support substrate 50 may be optically polished, e.g., by lapping and polishing as described above, so that the surface is flat and smooth. Optically polished surfaces 52 and 26 may then be adhesively attached to each other with a suitable layer of optical adhesive 60. Desirably, second support substrate 50 may be planar in shape having a width of about 20 mm, a length of about 20 mm, and a thickness of about 2 mm. Layer of optical adhesive 60 desirably has a thickness less than about 2 $\mu$m.

As shown in FIG. 2D, assembly 70 (FIG. 2C) may be cut or diced through second support substrate 50, thinned optical material 20, and first support substrate 30, into a plurality of about 0.5 mm to about 1 mm thick slices 80. For example, assembly 70 may be diced using a diamond blade saw, wire saw, or wafer dicing machine.

Each slice 80 may be processed into a separate waveguide according to the following method steps in which slice 80 is laid flat and sandwiched between two separate support substrates. Advantageously, simultaneous processing of slices 80 results in the production of multiple optical waveguides allowing the process to be cost effective.

With reference to a single slice 80, as shown in FIG. 2E, a surface 82 of slice 80 in which surface 82 comprises first support substrate 30, optical material 20, and second support substrate 50, is optically polished, e.g., by lapping and polishing as described above, so that the surface is flat and smooth.

Surface 82 of slice 80 is then attached to a third support substrate 90 as shown in FIG. 2F. A top surface 92 of third support substrate 90 may be optically polished, e.g., by lapping and polishing as described above, so that the surface is flat and smooth. Optically polished surfaces 92 and 82 may then be adhesively attached to each other with a suitable layer of optical adhesive 100. In this exemplary embodiment, third support substrate 90 may be planar in shape having a width of about 4 mm, a length of about 20 mm, and a thickness of about 2 mm. Layer of optical adhesive 100 desirably has a thickness less than about 2 $\mu$m.

With reference to FIG. 2G, after slice 80 is attached to third support substrate 90, a surface 84 (FIG. 2F) is thinned and optically polished, e.g., by lapping and polishing as described above, to reduce the thickness a carefully controlled amount and to obtain a flat polished surface 86. In this illustrated method of fabrication, slice 80 initially comprises a thickness of about 0.5 to about 1 mm and is reduced in thickness to about 20 $\mu$m, so that core 12 is formed having a substantially square transverse cross-section that measures 20 $\mu$m×20 $\mu$m.

As shown in FIG. 2H, a fourth support substrate 110 is attached to optically polished surface 86 of slice 80 to form optical waveguide 10. A surface 112 of fourth support substrate 110 may be optically polished, e.g., by lapping and polishing as described above, so that the surface is flat and smooth. Optically polished surfaces 112 and 86 may then be adhesively attached to each other with a suitable layer of optical adhesive 120. In this exemplary embodiment, fourth support substrate 100 may be planar in shape having a width of about 4 mm, a length of about 20 mm, and a thickness of about 2 mm. Layer of optical adhesive 120 desirably has a thickness of less than about 2 $\mu$m. Preferably, first end 16 and second end 18 of optical waveguide 10 are optically polished. Wavelength-dependent optically reflective materials may be applied over the optical waveguide ends 16 and 18 to form an optical cavity which allows introduction of a pump energy at a predetermined wavelength into the optical waveguide and also allow radiation emission from the optical waveguide at a desired source wavelength.

Desirably, the mating surfaces of the optical material and the substrates have the same surface quality, and the thickness of the layer of adhesive between each of the mating surfaces is the same.

While the illustrated and disclosed method of fabricating a waveguide in which a thin, e.g., less than about 2 $\mu$m thick layer of optical adhesive is used to attach the substrates to the optical material, from the present description it will be appreciated by those skilled in the art that a layer of optical adhesive having a greater thickness may be used. For example, with a greater thickness layer of optical adhesive, e.g., greater than about 3 $\mu$m, the adhesive layer itself may provide suitable cladding to influence the waveguide properties. In this alternative embodiment, it would not be necessary to optically polish surfaces of the support substrate which mate with surfaces of optical material 20 and/or core 12. In this situation, the support substrates can be selected for their processing qualities irrespective of the refractive index. It should be noted that, for maintaining the surfaces of optical adhesive cladding layer, parallel and perpendicular to the core, and for maintaining the layer of optical adhesive at a constant thickness, it may be desirable to optically polish surfaces of the support substrates. In addition, practical issues such as edge breakage and differential polishing rates between the adhesive and core/cladding materials need to be considered in selecting appropriate optical adhesives and layer thickness.

Suitable optical waveguide assemblies fabricated from the methods according to the present invention may have dimensions in the range of about 2–5 mm×about 2–5 mm in cross-section and 5–30 mm in length although greater lengths are possible. This allows easy handling and mechanical fixturing of the optical waveguide during manufacture and optical testing.

Support structures 30, 50, 90, and 110 preferably comprise the same material having the same refractive index, e.g., being initially cut from a single common substrate. Layers of optical adhesive 40, 60, 100 and 120, desirably comprise the same optical adhesive having a refractive index desirably corresponding to the refractive index of the support substrates. Also desirably, the layers of optical adhesive provide adequate edge support to optical material 20 and support substrates 30, 50, 90, and 110 during the polishing and/or dicing steps so that degradation of the edges of the optical material and/or support substrates is minimized. Optical adhesives for use in the method according to the present invention may be suitable ultraviolet cured optical adhesives, e.g., Norland 61 manufactured and available from Norland Products Inc., of New Brunswick, N.J.

In order to improve the optical properties of optical waveguide 10 (e.g., polarization dependence), preferably optically polished surface 26 is substantially parallel to optically polished surface 22, optically polished surface 82 is substantially parallel to optically polished surface 86, and each of the four adjacent surfaces, e.g., optically polished surface 26 and 82, are substantially perpendicular to each other.

The fabrication process according to the present invention is also compatible with most optical materials, e.g., active materials such as laser crystals or doped glass for use as lasers, amplifiers, ASE sources and wavelength converters. Suitable active materials include $LiNbO_3$, Nd:YAG, Nd:Glass, Nd:YLF, Nd:$LiNbO_3$, Er:YAG, Er:Glass, Er:$LiNbO_3$, Er:Silicon, Cr:Forsterite, Cr:YAG, and Ti:$Al_2O_3$.

Table I presents various waveguide examples for a 1300 nm ASE source in accordance with the present invention. Note that these combinations are provided by way of example only, and there are countless additional waveguide formations which are possible. In each formation, however, the core material and cladding material will comprise structurally and/or chemically distinct materials which have been separately fabricated from physically different materials that are then brought together during the assembly process of the optical waveguide.

TABLE I

| Cladding material | Core material |
| --- | --- |
| Fused silica (n = 1.45) | Nd-doped YAG (n = 1.81) |
| Soda-lime glass (n = 1.5) | Nd-doped YAG (n = 1.81) |
| Fused silica (n = 1.45) | Nd-doped phosphate glass (n = 1.56) |
| Fused silica (n = 1.45) | Cr-doped Forsterite (n = 1.56) |
| Fused silica (n = 1.45) | SFL6 doped glass (n = 1.76) |
| Magnesium fluoride (n = 1.38) | Lithium niobate (n = 2.2) |
| Fused silica (n = 1.45) | Lithium niobate (n = 2.2) |
| Soda-lime glass (n = 1.5) | Cr-doped YAG (n = 1.8) |

While the illustrated optical waveguide is shown as an optical channel waveguide having a square cross-section, e.g., 20 μm by 20 μm core, from the present description it will be appreciated by those skilled in the art that optical waveguides may be fabricated by the methods of the present invention to have other cross-sectional configurations depending on the particular application and the desired propagation of an optical signal within the waveguide. For example, optical waveguides fabricated according to the present invention may be in the form of planar or slab optical waveguides having a rectangular transverse cross-section.

While the invention has been particularly shown and described with reference to preferred embodiment(s) thereof, it will be understood by those skilled in the art that various changes in form and details may be made therein without departing from the spirit and scope of the invention.

What is claimed is:

1. A method for forming an optical waveguide, said method comprising:
   attaching with an adhesive a first surface of an optical material to a first support substrate, and a second surface of said optical material to a second support substrate to form an adhesively attached assembly; and
   attaching with an adhesive opposite surfaces of at least a portion of said adhesively attached assembly to a third support substrate and to a fourth support substrate, said opposite surfaces each comprising at least portions of said first support substrate, said optical material, and said second support substrate.

2. The method of claim 1 wherein said optical material comprises a first material, said support substrates comprise a second material, and wherein said first material is at least one of structurally and chemically dissimilar from said second material.

3. The method of claim 2 wherein said optical material comprises a crystalline material and said support substrates comprise an amorphous material.

4. The method of claim 2 wherein said optical material comprises phosphate glass.

5. The method of claim 4 wherein said optical material comprises erbium doped glass.

6. The method of claim 4 wherein said support substrates comprise fused silica.

7. The method of claim 2 wherein said optical material comprises an active material.

8. The method of claim 1 further comprising polishing uncovered opposite ends of said optical material and applying a reflective material thereto.

9. The method of claim 1 further comprising thinning said optical material prior to polishing said second surface.

10. The method of claim 1 wherein said attaching said opposite surfaces to said third support substrate and to said fourth support substrate comprises attaching said third support substrate to one of said opposite surfaces of said adhesively attached assembly, thinning said adhesively attached assembly after adhesively attaching said third support substrate to said adhesively attached assembly, and attaching said forth support substrate to the other of said opposite surfaces of said adhesively attached assembly.

11. The method of claim 1 wherein said providing said third and fourth support substrates comprises providing said third support substrate comprising a polished surface and providing said fourth support substrate comprising a polished surface.

12. The method of claim 1 further comprising dicing said adhesively attached assembly to form a plurality of adhesively attached assemblies, wherein each of said plurality of adhesively attached assemblies is attachable to separate support substrates for forming separate optical waveguides.

13. A method for forming an optical waveguide, said method comprising:
   providing an assembly comprising an optical material disposed between and adhesively attached to a first support substrate and to a second support substrate; and
   attaching with an adhesive opposite surfaces of at least a portion of said adhesively attached assembly to a third support substrate and to a fourth support substrate, said opposite surfaces each comprising at least portions of said first support substrate, said optical material, and said second support substrate.

14. The method of claim 13 wherein said optical material comprises a first material, said support substrates comprise a second material, and wherein said first material is at least one of structurally and chemically dissimilar from said second material.

15. The method of claim 14 wherein said optical material comprises a crystalline material and said support substrates comprise an amorphous material.

16. The method of claim 14 wherein said optical material comprises phosphate glass.

17. The method of claim 16 wherein said optical material comprises erbium doped glass.

18. The method of claim 16 wherein said support substrates comprise fused silica.

19. The method of claim 17 wherein said optical material comprises an active material.

20. The method of claim 13 further comprising polishing uncovered opposite ends of said optical material and applying a reflective material thereto.

21. The method of claim 13 further comprising thinning said assembly prior to polishing said opposite surface.

22. The method of claim 13 wherein said providing said third and fourth support substrates comprise providing said third support substrate comprising a polished surface and providing said fourth support substrate comprising a polished surface.

23. The method of claim 13 further comprising dicing said adhesively attached assembly to form a plurality of adhesively attached assemblies, wherein each of said plurality of adhesively attached assemblies is attachable to separate support substrates for forming separate optical waveguides.

24. A method for forming a plurality of waveguides, said method comprising:
   dicing an adhesively attached assembly comprising an optical material disposed between and adhesively attached to a first support substrate and to a second support substrate to provide a plurality of adhesively attached assemblies each of which comprising a portion of said optical material disposed between and adhesively attached to a portion of said first support substrate and to a portion of a second support substrate;

providing a plurality of third support substrates;

attaching with an adhesive a first surface of at least portions of said first support substrate, said optical material, and said second support substrate of said adhesively attached assemblies to said plurality of third support substrates;

providing a plurality of fourth support substrates; and attaching with said adhesive a second surface of at least portions of said first support substrate, said optical material, and said second support substrate of said adhesively attached assemblies to said plurality of fourth support substrates.

25. The method of claim 24 wherein said optical material comprises a first material, said support substrates comprise a second material, and wherein said first material is at least one of structurally and chemically dissimilar from said second material.

26. The method of claim 25 wherein said optical material comprises a crystalline material and said support substrates comprise an amorphous material.

27. The method of claim 25 wherein said optical material comprises phosphate glass.

28. The method of claim 27 wherein said optical material comprises erbium doped glass.

29. The method of claim 27 wherein said support substrates comprise fused silica.

30. The method of claim 24 wherein said optical material comprises an active material.

31. The method of claim 24 further comprising polishing uncovered opposite ends of said optical material and applying a reflective material thereto.

32. The method of claim 24 further comprising thinning said optical material prior to polishing said second surface.

33. The method of claim 32 further comprising thinning said assembly prior to polishing said opposite surface.

34. A method for forming an optical waveguide, said method comprising:

providing an optical material;

providing a first support substrate, a second support substrate, a third support substrate, and a fourth support substrate, said optical material comprising a first material and said support substrates comprising a second material, said first material being at least one of structurally and chemically dissimilar from said second material;

attaching with an adhesive a first surface of said optical material to said first support substrate, and a second surface of said optical material to said second support substrate to form an adhesively attached assembly; and attaching with an adhesive opposite surfaces of at least a portion of said adhesively attached assembly to said third support substrate and to said fourth support substrate, said opposite surfaces each comprising at least portions of said first support substrate, said optical material, and said second support substrate.

35. The method of claim 34 wherein said optical material comprises a crystalline material and said support substrates comprise an amorphous material.

36. The method of claim 34 wherein said optical material comprises phosphate glass.

37. The method of claim 36 wherein said optical material comprises erbium doped glass.

38. The method of claim 36 wherein said support substrates comprise fused silica.

39. The method of claim 36 further comprising polishing uncovered opposite ends of said optical material and applying a reflective material thereto.

40. The method of claim 36 further comprising thinning said optical material prior to polishing said second surface.

41. The method of claim 40 further comprising thinning said adhesively attached assembly prior to polishing said opposite surface.

42. The method of claim 34 further comprising dicing said adhesively attached assembly to form a plurality of assemblies, wherein each of said plurality of assemblies is attachable to separate support substrates for forming separate optical waveguides.

43. A method for forming an optical waveguide, said method comprising:

attaching with an adhesive four surfaces of an optical material to respective separate support substrates.

44. The method of claim 43 wherein said optical material comprises a first material, said support substrates comprise a second material, and wherein said first material is at least one of structurally and chemically dissimilar from said second material.

45. The method of claim 43 further comprising providing said optical material and thinning said optical material to form said surfaces.

46. The method of claim 43 further comprising polishing at least one of said surfaces after adhesively attaching at least one of said support substrates to at least one different surface of said surfaces.

47. The method of claim 43 wherein said optical material comprises a crystalline material and said support substrates comprise an amorphous material.

48. The method of claim 43 wherein said optical material comprises phosphate glass.

49. The method of claim 48 wherein said optical material comprises erbium doped glass.

50. The method of claim 48 wherein said support substrates comprise fused silica.

51. The method of claim 43 wherein said optical material comprise an active material.

52. The method of claim 43 further comprising polishing uncovered opposite ends of said optical material and applying a reflective material thereto.

53. A method for forming an adhesively attached assembly for use in forming an optical waveguide, said method comprising:

providing an optical material;

providing a first support substrate;

providing an adhesive;

attaching with said adhesive said optical material to said first support substrate;

providing a second support substrate; and attaching with said adhesive said optical material to said second support substrate to form the adhesively attached assembly.

54. The method of claim 53 wherein said optical material comprises a first material, said support substrates comprise a second material, and wherein said first material is at least one of structurally and chemically dissimilar from said second material.

55. The method of claim 54 wherein said optical material comprises a crystalline material and said support substrates comprise an amorphous material.

56. The method of claim 53 wherein said optical material comprises phosphate glass.

57. The method of claim 56 wherein said optical material comprises erbium doped glass.

58. The method of claim 56 wherein said support substrates comprise fused silica.

59. The method of claim 53 wherein said optical material comprises an active material.

60. The method of claim 53 further comprising polishing opposite surfaces of said adhesively attached assembly, said opposite polished surfaces comprising at least portions of said first support substrate, said optical material, and said second support substrate.

61. The method of claim 53 further comprising dicing said assembly to form a plurality of assemblies, wherein each of said plurality of assemblies is attachable to separate third and fourth support substrates for forming separate optical waveguides.

62. An optical waveguide comprising:

an elongated optical material having four surfaces; and a plurality of support substrates each of which is adhesively attached to a different one of said four surfaces.

63. The optical waveguide of claim 62 wherein said optical material comprises a first material, said support substrates comprise a second material, and wherein said first material is at least one of structurally and chemically dissimilar from said second material.

64. The optical waveguide of claim 63 wherein said optical material comprises a crystalline material and said support substrates comprise an amorphous material.

65. The optical waveguide of claim 63 wherein said optical material comprises phosphate glass.

66. The optical waveguide of claim 65 wherein said optical material comprises erbium doped glass.

67. The optical waveguide of claim 65 wherein said support substrates comprised fused silica.

68. The optical waveguide of claim 62 wherein said optical material comprises an active material.

69. The optical waveguide of claim 62 wherein said optical material comprises polished opposite ends and a reflective material disposed thereon.

70. An assembly for use in forming a plurality of optical waveguides, said assembly comprising:

an optical material having first and second surfaces;

a first support substrate adhesively attached to said first surface;

a second support substrate adhesively attached to said second surface; and wherein said optical material comprises a first material, said support substrates comprise a second material, and said first material is at least one of structurally and chemically dissimilar from said second material.

71. The assembly of claim 70 wherein said optical material comprises a crystalline material and said support substrates comprise an amorphous material.

72. The assembly of claim 70 wherein said optical material comprises phosphate glass.

73. The assembly of claim 72 wherein said optical material comprises erbium doped glass.

74. The assembly of claim 72 wherein said support substrates comprise fused silica.

75. The assembly of claim 70 wherein said optical material comprises an active material.

76. The assembly of claim 70 further comprising opposite polished surfaces, said opposite polished surfaces comprising said first support substrate, said optical material, and said second support substrate.

* * * * *

UNITED STATES PATENT AND TRADEMARK OFFICE
CERTIFICATE OF CORRECTION

PATENT NO.    : 6,511,571 B2                                               Page 1 of 1
DATED         : January 28, 2003
INVENTOR(S)   : McCallion et al.

It is certified that error appears in the above-identified patent and that said Letters Patent is hereby corrected as shown below:

<u>Column 9,</u>
Line 65, delete "36" and insert -- 34 --

<u>Column 10,</u>
Line 1, delete "36" and insert -- 34 --

Signed and Sealed this

Tenth Day of June, 2003

JAMES E. ROGAN
*Director of the United States Patent and Trademark Office*